United States Patent
Choi

(10) Patent No.: US 11,814,195 B1
(45) Date of Patent: Nov. 14, 2023

(54) SILICON OXIDE COATED ALUMINIZED KAPTON RADIATOR COATING FOR NANO-SATELLITE THERMAL MANAGEMENT

(71) Applicant: United States of America as represented by the Administrator of NASA, Washington, DC (US)

(72) Inventor: Michael Choi, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 1049 days.

(21) Appl. No.: 16/550,977

(22) Filed: Aug. 26, 2019

(51) Int. Cl.
 *B64G 1/22* (2006.01)
 *B64G 1/40* (2006.01)
 (Continued)

(52) U.S. Cl.
 CPC ............. *B64G 1/226* (2013.01); *B64G 1/10* (2013.01); *B64G 1/409* (2013.01); *B64G 1/425* (2013.01);
 (Continued)

(58) Field of Classification Search
 CPC .......... B64G 1/226; B64G 1/10; B64G 1/409; B64G 1/425; B64G 1/443; C04B 33/12;
 (Continued)

(56) References Cited

U.S. PATENT DOCUMENTS 3,176,933 A * 4/1965 Clemmons, Jr. ........ F24S 50/80
  244/158.3
4,397,716 A * 8/1983 Gilliland ................ C25D 11/08
  205/213
(Continued)

FOREIGN PATENT DOCUMENTS

CN    108482710 A  *  9/2018
CN    108528761 A  *  9/2018
(Continued)

OTHER PUBLICATIONS

Sheldahl, Redbook Aerospace Thermal Control Materials, Oct. 2007, p. 77.*

*Primary Examiner* — Benjamin P Lee
(74) *Attorney, Agent, or Firm* — Trenton J. Roche; Matthew F. Johnston

(57) ABSTRACT

The present invention relates to an innovative thermal design concept of tailoring the absorptance and emittance of a coating—namely silicon oxide (SiOx) coated aluminized Kapton—as a radiator coating for small, nano-satellite (i.e., CubeSat) thermal management. The present invention improves on the thermal design of existing satellites, by: a) thermally coupling all components to the baseplate to eliminate the need for heater power for the battery; b) using all six sides of the CubeSat as radiators by changing the wall material from fiberglass to aluminum; c) using a different ratio of absorptance to emittance for each side by tailoring the $SiO_x$ thickness; d) having a high emittance for the wall interior and components; and e) eliminating the need for MLIs. The elimination of the MLIs reduces the volume and increases the clearance to minimize the risk for solar array deployment and cost of the thermal control subsystem.

11 Claims, 2 Drawing Sheets

(51) Int. Cl.
*B64G 1/10* (2006.01)
*B64G 1/42* (2006.01)
*B64G 1/44* (2006.01)
*C04B 35/14* (2006.01)
*C04B 35/622* (2006.01)
*C01B 33/12* (2006.01)
*H01B 1/14* (2006.01)

(52) U.S. Cl.
CPC .............. *B64G 1/443* (2013.01); *C01B 33/12* (2013.01); *C04B 35/14* (2013.01); *C04B 35/62222* (2013.01); *C04B 2235/3293* (2013.01); *C04B 2235/3418* (2013.01); *H01B 1/14* (2013.01)

(58) Field of Classification Search
CPC .............. C04B 35/14; C04B 35/62222; C04B 2235/3293; C04B 2235/3418; H01B 1/14
See application file for complete search history.

(56) References Cited

U.S. PATENT DOCUMENTS

| | | | | |
|---|---|---|---|---|
| 4,939,031 A * | 7/1990 | Torre | ............... | G02B 1/14 |
| | | | | 428/912.2 |
| 5,296,285 A * | 3/1994 | Babel | ............... | B64G 1/54 |
| | | | | 428/323 |
| 6,331,357 B1 * | 12/2001 | Hasegawa | ............... | C23C 30/00 |
| | | | | 428/446 |
| 6,394,395 B1 * | 5/2002 | Poturalski | ............... | B64G 1/66 |
| | | | | 244/172.7 |
| 6,669,147 B2 * | 12/2003 | Bertheux | ............... | B64G 1/503 |
| | | | | 244/172.6 |
| 8,616,271 B2 * | 12/2013 | Hugon | ............... | B64G 1/503 |
| | | | | 165/41 |
| 10,583,632 B2 * | 3/2020 | Minton | ............... | C09D 143/04 |
| 10,737,808 B2 * | 8/2020 | Cruijssen | ............... | B64G 1/503 |
| 10,745,152 B2 * | 8/2020 | Spangelo | ............... | B64G 1/44 |
| 10,815,013 B1 * | 10/2020 | Hasegawa | ............... | C23C 14/086 |
| 11,254,452 B2 * | 2/2022 | Mena | ............... | B64G 1/58 |
| 2003/0141417 A1 * | 7/2003 | Cordaro | ............... | B64G 1/226 |
| | | | | 244/171.7 |
| 2009/0196986 A1 * | 8/2009 | Cordaro | ............... | B64G 1/226 |
| | | | | 427/126.3 |
| 2012/0090658 A1 * | 4/2012 | Streett | ............... | C09D 5/24 |
| | | | | 244/171.7 |
| 2012/0193015 A1 * | 8/2012 | Segal | ............... | H01Q 1/288 |
| | | | | 156/60 |
| 2015/0151855 A1 * | 6/2015 | Richards | ............... | B64G 1/002 |
| | | | | 244/171.1 |
| 2016/0340061 A1 * | 11/2016 | Bose | ............... | H05K 7/20254 |
| 2017/0063296 A1 * | 3/2017 | Cruijssen | ............... | B64G 1/443 |
| 2018/0037341 A1 * | 2/2018 | Kalman | ............... | B64G 1/222 |
| 2019/0144142 A1 * | 5/2019 | Spark | ............... | B64G 1/222 |
| | | | | 244/172.6 |

FOREIGN PATENT DOCUMENTS

| | | | | |
|---|---|---|---|---|
| EP | 3536617 A1 * | 9/2019 | ............. | B64G 1/10 |
| WO | WO-2015031699 A2 * | 3/2015 | ............. | B64G 1/002 |
| WO | WO-2020202221 A1 * | 10/2020 | ............. | B64G 1/66 |

* cited by examiner

SILICON OXIDE COATED ALUMINIZED KAPTON RADIATOR COATING FOR NANO-SATELLITE THERMAL MANAGEMENT

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates to an innovative thermal design concept of tailoring the absorptance and emittance of a coating—namely silicon oxide ($SiO_x$) coated aluminized Kapton—as a radiator coating for small, nano-satellite (i.e., CubeSat) thermal management.

2. Description of the Related Art

Space missions to investigate the sun's influence on Earth's upper atmosphere are being implemented using small, nano-satellites, such as CubeSats, having a suite of miniaturized instruments and components. The CubeSats are sized at 0.25 U to 27 U (where 1 U is 10-by-10-by-10 cubic centimeters) and weigh only about 0.2 kg to 40 kg.

The space missions include a constellation of four 6 U Cubesats with the science goal to quantitatively determine the contribution of microbursts to electron loss in the Van Allen radiation belts. The constellation of CubeSats are to fly in sun synchronous low Earth orbit.

A CubeSat has either deployable solar arrays or body mounted solar cells, or both, to generate adequate electrical power to meet its mission power requirement. Its internal components dissipate heat. In order to maintain the component temperatures within allowable flight limits, the waste heat needs to be radiated from its exterior to deep space. Depending on the orbit parameters, one or more of the exterior surfaces could be exposed to sunlight, planet albedo (measure of diffuse reflection of solar radiation out of total solar radiation received on planet), or planet infrared flux. Additionally, there could be thermal excursions due to sunlight and eclipse.

The CubeSats utilize lithium ion batteries, and the battery temperature is required to be above 0° C. during charging. Conventionally, a combination of radiator thermal coatings, multilayer insulation (MLI) blankets and active heater control are used to meet the component thermal requirements, but the thickness of the MLI blankets is large—i.e., 0.625 cm or larger. Further, MLI blankets increase the risk of solar array deployment on a CubeSat.

Eliminating the heater power for the battery and eliminating the need for MLI blankets, will ensure that there is no increase the volume of the CubeSat, and will decrease the risk of solar array deployment. Further, a decrease in cost for existing CubeSat missions is needed.

SUMMARY OF THE INVENTION

The present invention relates to an innovative thermal design concept of tailoring the absorptance and emittance of a coating—namely silicon oxide ($SiO_x$) coated aluminized Kapton—as a radiator coating for small, nano-satellite (i.e., CubeSat) thermal management. The present invention improves on the thermal design of existing satellites, by: a) thermally coupling the battery to the baseplate to eliminate the need for heater power for the battery; b) using all six sides of the CubeSat as radiators by changing the wall material from fiberglass to aluminum; c) using a different ratio of absorptance to emittance for each side by tailoring the $SiO_x$ thickness; d) having a high emittance for the wall interior and components; and e) eliminating the need for MLIs. The elimination of the MLIs reduced the volume and increases the clearance to minimize the risk for solar array deployment and cost of the thermal control subsystem.

In one embodiment, a nano-satellite, includes: a body having six external sides, each side coated with a coating of a silicon oxide ($SiO_x$) thin-film coated aluminized Kapton, or a silicon oxide ($SiO_x$)/aluminum oxide ($Al_2O_3$)/silver (Ag)/Kapton, with a different ratio of absorptance to emittance $\alpha/\epsilon$ on each of the six external sides achieved by adjusting a thickness of the $SiO_x$ of said coating.

In one embodiment, a nano-satellite, includes: a body having six sides; and a pair of deployable solar array wings on a +Y side and on a −Y side of the body and attached to the body.

In one embodiment, a nano-satellite, includes: a body having six external sides, each side coated with a coating of a silicon oxide ($SiO_x$) thin-film coated aluminized Kapton, or a silicon oxide ($SiO_x$)/aluminum oxide ($Al_2O_3$)/silver (Ag)/Kapton, with a different ratio of absorptance to emittance $\alpha/\epsilon$ on each of the six external sides achieved by adjusting a thickness of the $SiO_x$ of the coating; and a pair of deployable solar array wings on a +Y side and on a −Y side of the body and attached to the body.

In one embodiment, the nano-satellite further includes: a pair of deployable solar array wings on a +Y side and on a −Y side of the body and attached to the body.

In one embodiment, each of the six external sides is coated with a coating of a silicon oxide ($SiO_x$) thin-film coated aluminized Kapton, or a silicon oxide ($SiO_x$)/aluminum oxide ($Al_2O_3$)/silver (Ag)/Kapton, with a different ratio of absorptance to emittance $\alpha/\epsilon$ on each of the six external sides achieved by adjusting a thickness of the $SiO_x$ of the coating.

In one embodiment, a back side of the pair of deployable solar array wings is coated with the coating of the silicon oxide ($SiO_x$) thin-film coated aluminized Kapton, or $SiO_x$/aluminum oxide ($Al_2O_3$)/silver (Ag)/Kapton, with a different ratio of absorptance to emittance $\alpha/\epsilon$ on each of the six external sides achieved by adjusting a thickness of the $SiO_x$ of the coating.

In one embodiment, the nano-satellite is a 0.25 U to 27 U CubeSat.

In one embodiment, the coating is made conductive by adding an indium tin oxide (ITO).

In one embodiment, the coatings for an interior of the body and an interior of the deployable solar array wings are high-emittance $\epsilon$ coatings.

In one embodiment, all internal components of the body are thermally coupled to the six external sides as radiators.

In one embodiment, the body includes an aluminum alloy frame; and waste heat from the internal components is transferred by conduction to the six external sides as the radiators through the aluminum structure or frame of the body.

In one embodiment, the nano-satellite further includes: a lithium ion battery disposed in the body; wherein one of the six external sides of the body is a baseplate; and wherein the lithium ion battery is thermally coupled to the baseplate.

In one embodiment, command and data handling (C&DH) components are thermally coupled to the lithium ion battery using a pyrolytic graphite film (PGF) thermal strap.

In one embodiment, the nano-satellite further includes: a gas micro-propulsion system (MiPs).

In one embodiment, a −Z side of the nano-satellite is zenith-pointing to meet requirements of a clear field of view (FOV) for a zenith direction, and a dosimeter clear FOV requirement in +Z direction.

In one embodiment, the nano-satellite has a Sun Synchronous Orbit (SSO) with an altitude of 500 to 600 km, and an inclination of 97.4°-97.8°.

In one embodiment, the absorptance $\alpha$ is in a range of 0.08 to 0.20, and the emittance $\epsilon$ is in a range of 0.20 to 0.58.

Thus, has been outlined, some features consistent with the present invention in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

DESCRIPTION OF THE INVENTION

The present invention relates to an innovative thermal design concept of tailoring the absorptance and emittance of a coating—namely silicon oxide ($SiO_x$) coated aluminized Kapton—as a radiator coating for small, nano-satellite (i.e., CubeSat) thermal management.

In the present invention, a constellation of nano-satellites, for example four 6 U CubeSats, will take part in the space mission to investigate the sun's influence on Earth's upper atmosphere, in order to quantitatively determine the contribution of microbursts to electron loss in the Van Allen radiation belts. The constellation of CubeSats are to fly in sun synchronous low Earth orbit.

Figure 1:
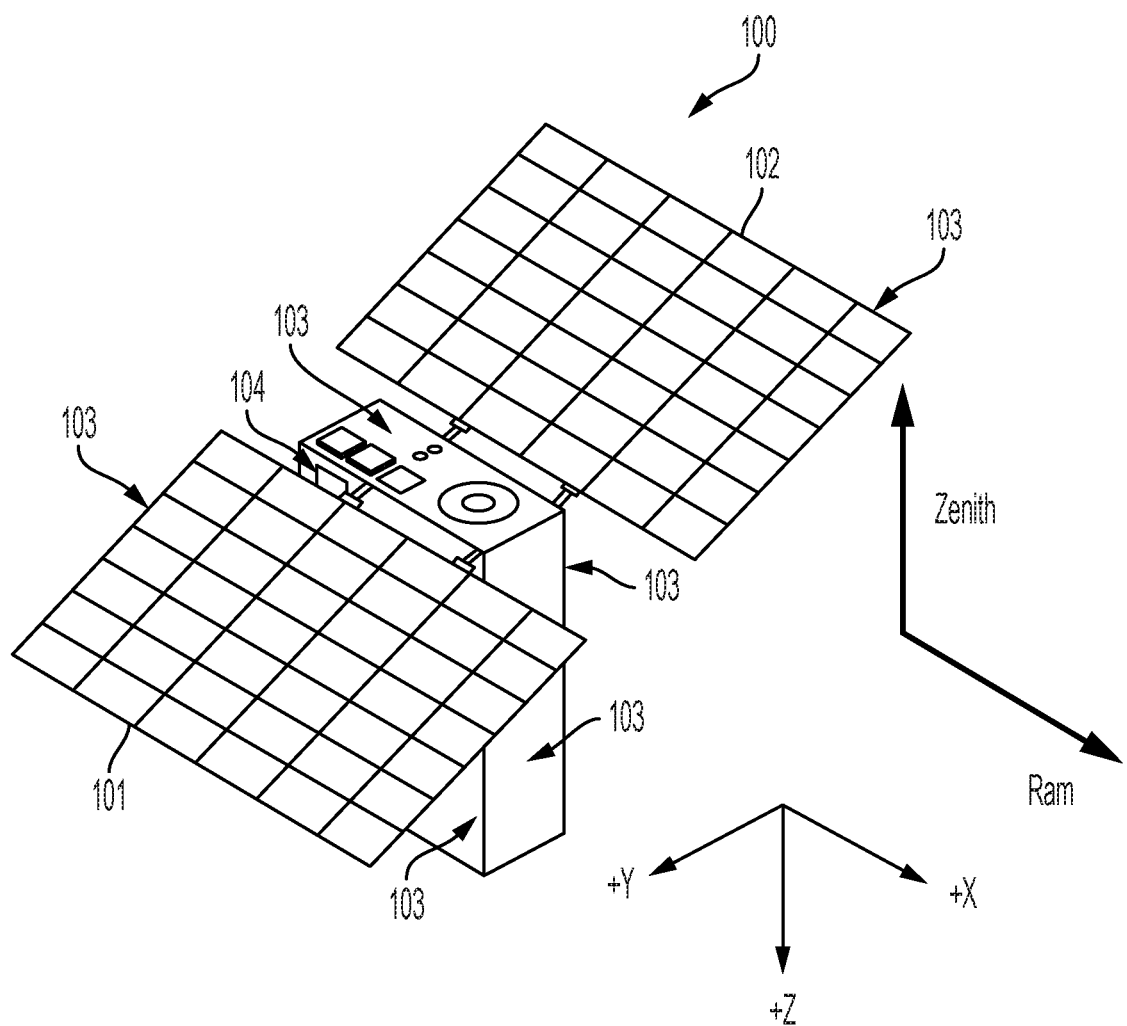
FIG. 1 is a schematic diagram of the nano-satellite, or CubeSat, with its solar arrays deployed, according to one embodiment of the present invention.

As shown in FIG. 1, the CubeSat 100 of the present invention is a small, nano-satellite 100, sized at 0.25 U to 27 U (where 1 U is 10-by-10-by-10 cubic centimeters) and weighs only about 0.2 kg to 40 kg. The CubeSat 100 has two deployable solar array wings 101, 102—one solar array 101 on the +Y side, and the other solar array 102 on the −Y side—which do not track the sun.

In one embodiment, in the stowed configuration, the solar arrays 101, 102 are folded against the spacecraft 100. When deployed, the solar array wings 101, 102 have radiation exchange with the −Y (radiator) and +Y sides—a novel design over existing similar satellites (i.e., CubeSats) which have solar cells attached to the +Y, +X and −X sides, and no deployable solar array wings.

In one embodiment, the radiators (arrays 101, 102) can be fabricated as 50 cm×50 cm sheets. In one embodiment, the total thickness of the sheets can be approximately 2-mil (0.0508 mm), which is predominately the Kapton thickness.

In one embodiment, the present invention includes a plurality of solar cells 104 (i.e., eight solar cells), on the +Y surface of the 6 U CubeSat 100. In one embodiment, solar cell 104 efficiency is about 29%.

In one embodiment, the body of the nano-satellite 100 and the solar array wings 101, 102 have a low absorptance $\alpha$ and high emittance $\epsilon$ coating 103 applied to the external sides, and the backside of the solar array wings, respectively, for temperature control. The coating 103 of the present invention is used for the exposed surfaces on all the six sides of the satellite 100 (i.e., CubeSat).

In one embodiment, the coating 103 is a silicon oxide ($SiO_x$) thin-film-coated aluminized Kapton, or a $SiO_x$/aluminum oxide ($Al_2O_3$)/silver (Ag)/Kapton, used as the radiators' and solar array wing 101, 102 backsides' thermal coating.

Figure 2:
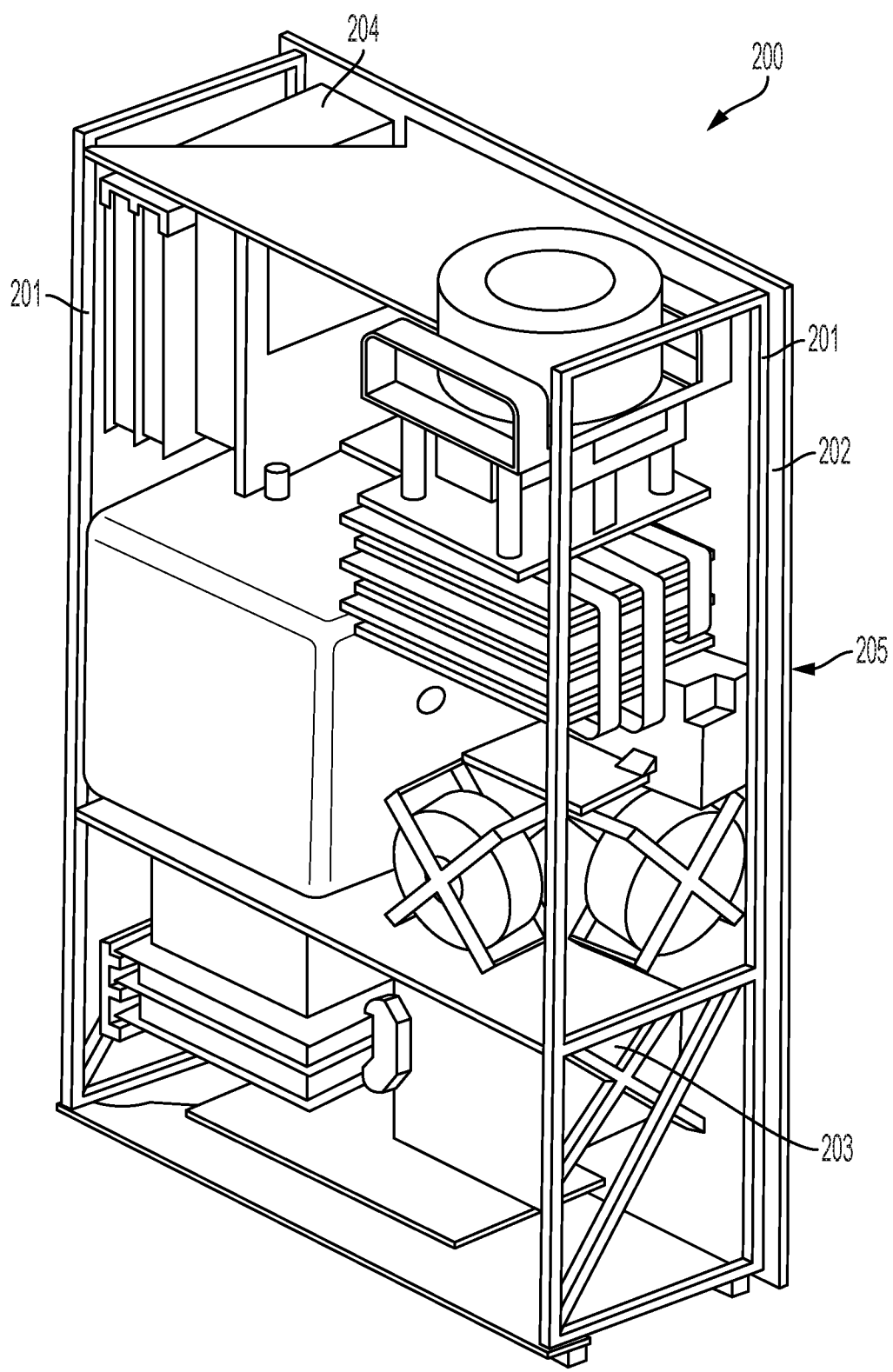
FIG. 2 is a cutaway schematic diagram of the major internal components of the satellite of FIG. 1, according to one embodiment consistent with the present invention.

Accordingly, in the present invention, the thermal design uses all the exposed surfaces on the six sides of the CubeSat 100 as radiators, and all the internal components are thermally coupled to the radiators. In one embodiment, waste heat from the internal components is transferred by conduction to the radiators through its aluminum structure or frame 201 (see cutaway drawing at FIG. 2), of the CubeSat 200. In one embodiment, the waste heat from the components helps maintain battery temperature above 0° C. without heater power.

In one embodiment, the aluminum alloy baseplate (−Y side) 202 is used as the heat sink for all the internal components, including the battery 203 (i.e., lithium ion battery).

In one embodiment, the other five (5) sides of the CubeSat 200 are also made of aluminum alloy (instead of prior art FR4 (fiberglass)). The $SiO_x$ aluminized Kapton 205 is bonded to the exterior of all six sides of the CubeSat body 200 by using an acrylic transfer adhesive.

In one embodiment, the aluminum frame 201 transfers heat by conduction from the baseplate 202 to the other five sides of the CubeSat 200, which serve as radiators. The use of all six sides as radiators, and $SiO_x$ coated aluminized Kapton as radiator coating 205 for a CubeSat 200 with deployable solar arrays, has been successfully flight proven.

In one embodiment, the ratio of absorptance to emittance α/ε can be tailored to meet the desired thermal requirements using the coating 103 (i.e., $SiO_x$/Aluminum/Kapton) applied on the six external sides of the body of the nano-satellite 100, by adjusting the thickness of the thin film 103 (i.e., $SiO_x$). The practical thickness range for the $SiO_x$ thin film to provide the α and ε ranges is 2,000 to 30,000 angstroms. The emittance ε increases as the thickness increases.

In other words, the coating 103 of the present invention allows the ratio of absorptance to emittance α/ε to vary from each external side 103 to external side 103 to meet component thermal requirements. Since the coating 103 is a thin film, changing its thickness has no significant effect on the total thickness of the radiator coating.

In one embodiment, for $SiO_x$ coated aluminized Kapton, the inventor achieved an absorptance a as low as 0.08 and as high as 0.20, and an emittance ε as low as 0.20 and as high as Therefore, the absorptance α and emittance ε can be tailored, within the above ranges, to a ratio α/ε needed for thermal management to meet the necessary component temperature requirements. By tailoring the absorptance to emittance α/ε for each of the six sides of the body 100 of the present invention, the external MLI blankets and active heater control of existing prior art satellites, can be eliminated.

In one embodiment of the present embodiment, the coating 103 resists atomic oxygen erosion.

In one embodiment, the coatings for the interior of the satellite 100 of the present invention are high emittance ε coatings (i.e., Kapton tape, black Kapton tape, etc.), as well as for the interior of the panels 102, 103, which enhance thermal radiation.

In the present invention, in order to meet the electrostatic discharge requirement, conductive coating is used on the instruments of the present CubeSat 100. The thermal coatings, such as silver Teflon, are non-conductive.

In one embodiment, the coating 103 can be made conductive by adding indium tin oxide (ITO), without affecting the absorptance α or emittance ε.

In one embodiment, the lithium ion battery 203 of the CubeSat 200 is thermally coupled to the baseplate 202.

In one embodiment, the command and data handling (C&DH) components 204 have about 44% total power dissipation in science mode. A pyrolytic graphite film (PGF) thermal strap is used to thermally couple the C&DH 204 to the lithium ion battery 203. The C&DH 204 waste heat helps maintain the battery 203 temperature above 0° C. without heater power.

In one embodiment, the substrate of solar cells 104 on the +Y 2 U panel are conductively isolated from the panel by using spacers (i.e., Ultem spacers) and radiatively isolated by vapor deposited aluminum (VDA) tape. The solar cells 104 are very hot at high solar beta angles. Thermal isolation minimizes the heat load from the sun to the CubeSat 100 internal components.

In one embodiment, a thermal interface material (gap filler) includes using indium foil (99.9% indium) for smaller contacts, or silicone thermal grease with thin bond line if separation of parts is not an issue, or Apiezon-H high vacuum grease if separation of parts is an issue (as it can be easily removed).

In the present invention, the CubeSat 100 has a cold gas micro-propulsion system (MiPs), which differs from existing similar CubeSats which have no propulsion. In propulsion mode, power changes for the present invention include: 3.99 W power used on valves and for heating cold gas refrigerant; no waste heat from propulsion is added to the spacecraft baseplate 202; PSE power dissipation increases by 1.02 W; radio frequency (RF) communication power dissipation increases by 0.97 W; instruments are powered off, so that power dissipation decreases by 0.85 W. In one embodiment, overall, waste heat to the spacecraft baseplate 202 increases by 1.14 W.

In one embodiment, the space charging (proton and electron) environment for the present invention is different from that of existing satellites. In one embodiment, the −Z side of the CubeSat 100 is zenith-pointing to meet instrument requirements of clear field of view (FOV) for the zenith direction, and the dosimeter instrument's clear FOV requirement in +Z direction.

In addition, the spacecraft pointing is different from that of existing satellites. In one embodiment, the present invention has a sun synchronous polar orbit with a ~600 km altitude and >75° inclination, which is different from similar satellites that have low Earth orbits with a ~400 km altitude and 51.6° inclination. More specifically, with a Sun Synchronous Orbit (SSO) with an altitude within 500 to 600 km, and if the altitude is 500-600 km altitude, the inclination of the spacecraft of the present invention should be 97.4°-97.8°.

With the features described above with the present invention, temperature predictions for all spacecraft and instrument components in worst hot case and worst cold case, in both science and propulsion modes, are within allowable flight limits and have adequate margins.

The present invention improves on the thermal design of existing nano-satellites, by: a) thermally coupling the battery to the baseplate to eliminate the need for heater power for the battery; b) using all six sides of the CubeSat as radiators by changing the wall material from fiberglass to aluminum; c) using a different ratio of absorptance to emittance for each side by tailoring the $SiO_x$ thickness; d) having a high emittance for the wall interior and components; and e) eliminating the need for MLIs. The elimination of the MLIs reduces the volume and increases the clearance to minimize the risk for solar array deployment and cost of the thermal control subsystem.

The present invention has commercial applications for small spacecraft (i.e., CubeSat) thermal management.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A nano-satellite, comprising:
a body having six external sides, each side coated with a coating of a silicon oxide (SiOx) thin-film coated aluminized Kapton, or a silicon oxide (SiOx)/aluminum oxide (Al2O3)/silver (Ag)/Kapton, with a different ratio of absorptance to emittance α/ε on each of said six external sides achieved by adjusting a thickness of said SiOx of said coating; and
a pair of deployable solar array wings on a +Y side and on a −Y side of said body and attached to said body; wherein a back side of said pair of deployable solar array wings is coated with said coating of said silicon oxide (SiOx) thin-film coated aluminized Kapton, or SiOx/aluminum oxide (Al2O3)/silver (Ag)/Kapton, with a different ratio of absorptance to emittance α/ε on each of said six external sides achieved by adjusting a thickness of said SiOx of said coating; and wherein said absorptance of said coating of said silicon oxide (SiOx) α is in a range of 0.08 to 0.20 and said emittance ϵ is in a range of 0.20 to 0.58.

2. The nano-satellite of claim 1, wherein the nano-satellite is a 0.25 U to 27 U CubeSat.

3. The nano-satellite of claim 1, wherein said coating is made conductive by adding an indium tin oxide (ITO).

4. The nano-satellite of claim 1, wherein coatings for an interior of said body and an interior of said deployable solar array wings are high-emittance ϵ coatings.

5. The nano-satellite of claim 4, wherein all internal components of said body are thermally coupled to said six external sides as radiators.

6. The nano-satellite of claim 5,
wherein said body includes an aluminum alloy frame; and
wherein waste heat from said internal components is transferred by conduction to said six external sides as said radiators through said aluminum structure or frame of said body.

7. The nano-satellite of claim 6, further comprising:
a lithium ion battery disposed in said body;
wherein one of said six external sides of said body is a baseplate; and
wherein said lithium ion battery is thermally coupled to said baseplate.

8. The nano-satellite of claim 7, wherein command and data handling (C&DH) components are thermally coupled to said lithium ion battery using a pyrolytic graphite film (PGF) thermal strap.

9. The nano-satellite of claim 8, further comprising:
a gas micro-propulsion system (MiPs).

10. The nano-satellite of 1, wherein a −Z side of the nano-satellite is zenith-pointing to meet requirements of a clear field of view (FOV) for a zenith direction, and a dosimeter clear FOV requirement in +Z direction.

11. The nano-satellite of claim 1, wherein the nano-satellite has a Sun Synchronous Orbit (SSO) with an altitude of 500 to 600 km, and an inclination of 97.4°-97.8°.

\* \* \* \* \*